(12) United States Patent
Taghadoss

(10) Patent No.: US 6,175,867 B1
(45) Date of Patent: Jan. 16, 2001

(54) SYSTEM AND METHOD FOR MANAGING NETWORKS ADDRESSED VIA COMMON NETWORK ADDRESSES

(75) Inventor: Mehdi Taghadoss, Cary, NC (US)

(73) Assignee: MCI World Com, Inc., Jackson, MS (US)

( * ) Notice: Under 35 U.S.C. 154(b), the term of this patent shall be extended for 0 days.

(21) Appl. No.: 09/046,189

(22) Filed: Mar. 23, 1998

(51) Int. Cl.[7] .............................. G06F 13/38; G06F 15/17
(52) U.S. Cl. .................... 709/223; 709/224; 709/225; 709/228; 709/238; 370/401
(58) Field of Search ................... 709/249, 223, 709/238, 224; 370/407, 408, 392, 401

(56) References Cited

U.S. PATENT DOCUMENTS

| | | | |
|---|---|---|---|
| 4,933,938 | * | 6/1990 | Sheehy ............................ 370/85.13 |
| 5,313,465 | * | 5/1994 | Perlman et al. ................... 370/85.13 |
| 5,428,615 | * | 6/1995 | Backes et al. .................... 370/85.13 |
| 5,568,613 | * | 10/1996 | Futral .............................. 395/200.02 |
| 5,636,216 | * | 6/1997 | Fox et al. ......................... 370/402 |
| 5,781,550 | * | 6/1998 | Templin ........................... 370/401 |
| 5,802,316 | * | 9/1998 | Ito et al. ........................... 709/249 |
| 5,845,087 | * | 12/1998 | Trehus ............................. 709/242 |
| 5,856,974 | * | 1/1999 | Gervais et al. ................... 370/392 |
| 5,884,025 | * | 3/1999 | Baehr et al. ..................... 395/187.01 |
| 5,910,955 | * | 6/1999 | Nishimura et al. .............. 370/401 |
| 5,917,821 | * | 6/1999 | Gobuyan et al. ................. 370/392 |
| 5,930,257 | * | 6/1999 | Smith et al. ...................... 370/401 |
| 5,940,394 | * | 8/1999 | Killian ............................. 370/393 |

\* cited by examiner

*Primary Examiner*—Zarni Maung
*Assistant Examiner*—Mahmanzar Moezz

(57) ABSTRACT

System and method for managing networks addressed via common network addresses. The system and method facilitate proper routing and processing of network packets within a network data processing environment. The system and method include and involve a router that has an interface for communicating a network packet. The network packet includes a network address. The interface has a unique interface identifier relative to the router. The router is configured to map the network address and the unique interface identifier to a unique network address and to replace the network address in the network packet with the unique network address. The system and method also include and involve a management system that is coupled to the router. The management system is configured to receive the network packet from the router, to map the unique network address in the network packet to a customer and/or usage identifier, and to process the network packet and data contained therein based on the customer/usage identifier.

37 Claims, 6 Drawing Sheets

SYSTEM AND METHOD FOR MANAGING NETWORKS ADDRESSED VIA COMMON NETWORK ADDRESSES

BACKGROUND OF THE INVENTION

1. Field of the Invention

The present invention relates to systems and methods that are used to manage networks that are addressed with common network addresses.

2. Description of the Related Art

With the increase in popularity of the Internet, the widespread deployment of intranets, and the growing use of Internet protocol (IP) based network technologies, many corporations and enterprises have established private networks which have become difficult and costly to manage effectively. Often, such private networks require deployment of large resource pools to service user populations, work forces that are highly skilled in resource management operations, and extensive physical facilities. As such, many enterprises have elected to outsource the management of their networks to third-party service providers. Although outsourcing has enabled enterprises to efficiently and effectively manage their private networks, service providers now face significant problems in managing such networks on behalf of their customers. For example, service providers now face having to manage two or more networks which may use common network addresses for internal network addressing and processing.

The problems associated with managing networks which are addressed by common network addresses are compounded when enterprises use IP technologies. For example, it is well known that there are not enough publicly addressable IP addresses to serve the needs of all who seek to utilize IP technologies. Accordingly, enterprises often must use network addresses in ranges that are approved by the Internet Engineering Task Force (IETF) in standard RFC 1918. The RFC 1918 standard provides the following network address ranges for private IP-based networks:

10.0.0.0 to 10.255.255.255

172.16.0.0 to 172.31.255.255

192.168.0.0 to 192.168.255.255

Although the above-listed network address ranges have allowed enterprises to adopt corresponding address blocks for internal use, it remains possible for two enterprises to select, adopt, and use one or more of the same network address. Since such a situation would result in two or more enterprises being addressable via a common IP address, service providers face a serious challenge in servicing more than one enterprise. In particular, service providers face deployment of separate resource farms (e.g., separate routers, computing systems, peripherals, etc.) if they desire to service two or more customers with common IP addresses. The costs associated with deploying such resources can outweigh the profits realized from managing a network on behalf of a customer. Such problems can lead to lost sales for service providers and a lack of network management options for enterprises who seek reliable network management services without being required to re-map or re-address their resources.

Thus, there exists a need to provide systems and methods for managing networks which may be addressed with commonly selected network addresses. To be viable such systems and methods must be capable of mapping otherwise common or duplicated network addresses into unique addresses which a management system may use in routing and processing corresponding network packets and data on behalf of a customer.

SUMMARY OF THE INVENTION

The present invention addresses the limitations and problems associated with the related art by providing systems and methods that enable commonly used network addresses to properly address network resources within a network data processing environment. The systems and methods provided by the present invention map network addresses into unique network addresses so that network resource addressing is properly performed. Unique network addresses may be based on router assignments relative to a particular private network. As such, two or more enterprises that internally use common network addresses can now have their networks managed by a common management entity without requiring deployment of additional network resources or re-addressing of network resources.

Accordingly, the present invention provides a system for routing and processing a network packet within a network data processing environment. The system includes a router having an interface for communicating a network packet that includes a network address. The interface has a unique interface identifier relative to the router. The router is configured to map the network address and the unique interface identifier to a unique network address and to replace the network address in the network packet with the unique network address. The system also includes a management system that is coupled to the router. The management system is configured to receive the network packet from the router, to map the unique network address in the network packet to a usage identifier, and to process the network packet and data contained therein based on the usage identifier.

According to another aspect of the present invention, provided is a router for routing a network packet within a network data processing environment. The router includes an interface for communicating a network packet. The network packet includes a network address. The interface has a unique interface identifier relative to the router. The router also includes an address mapping system for mapping the network address and the unique interface identifier to a unique network address, and for replacing the network address in the network packet with the unique network address. The router is configured to route the network packet within the network data processing environment based on the unique network address.

According to another aspect of the present invention, provided is a method for processing a network packet received from a network data processing environment. The method includes a step of receiving a network packet containing a unique network address. The unique network address is based on a network address corresponding to a network element within the network data processing environment. Another step involves mapping the unique network address into a usage identifier corresponding to a network resource addressable within the network data processing environment. An additional step involves processing the network packet based on usage parameters corresponding to the usage identifier According to another aspect of the present invention, provided is a method for routing a network packet within a network data processing environment. The method includes a step of formatting a network packet for transmission to a network element. The network packet includes a usage identifier and a network address corresponding to the usage identifier. The method further includes the steps of mapping the usage identifier and the network address into a unique network address, inserting the unique network address into the network packet, and routing the network packet to the network element based on the unique network address via the network data processing environment.

According to a another aspect of the present invention, provided is a method for routing and processing a network packet within a network data processing environment. The method includes a step of transmitting a network packet within the network data processing environment. The network packet includes a network address. The method further includes the steps of receiving the network packet, mapping the network address to a unique network address, replacing the network address in the network packet with the unique network address, sending the network address within the network data processing environment based on the unique network address, receiving the network packet, mapping the unique network address in the network packet to a usage identifier, and processing the network packet and data contained therein based on the usage identifier.

BRIEF DESCRIPTION OF THE DRAWINGS

The present invention is described in detail below with reference to the following drawing figures of which.

DETAILED DESCRIPTION OF THE PREFERRED EMBODIMENTS

Figure 1:
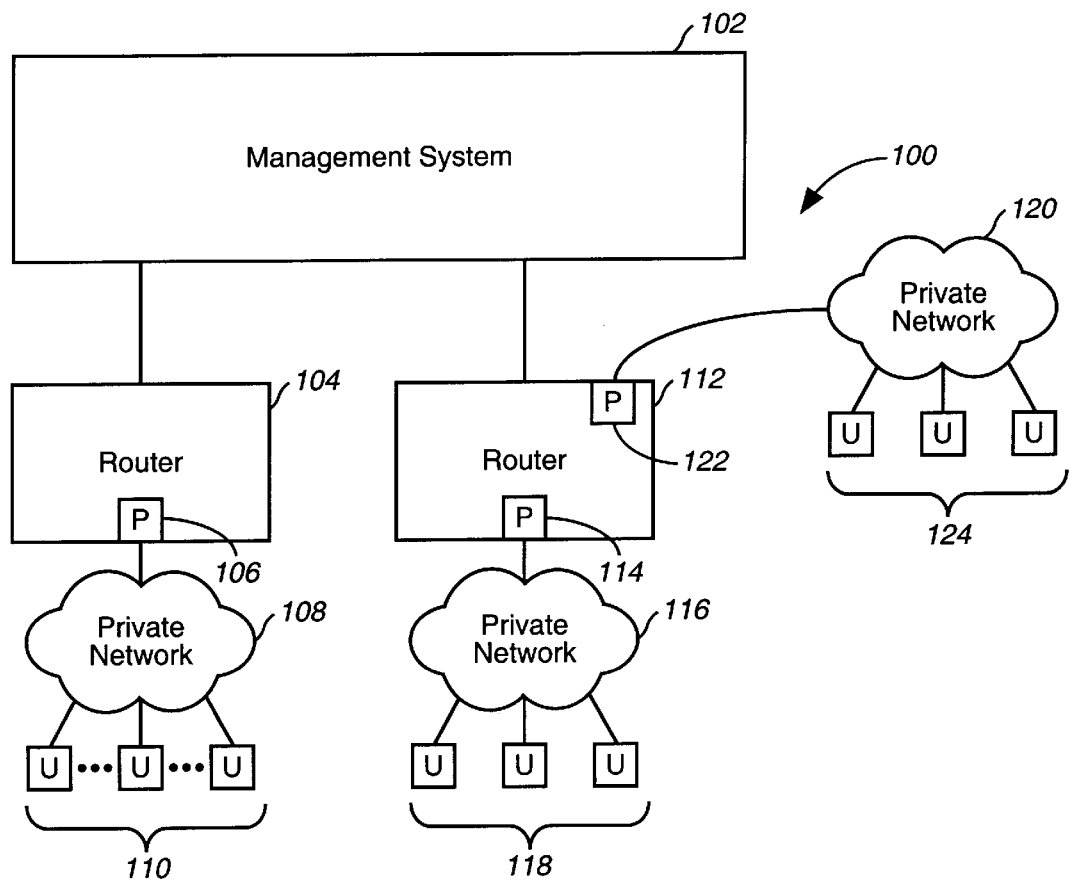
FIG. 1 is a block diagram of a network data processing system.

The present invention is now discussed in detail with regard to the drawing figures that were briefly described above. A discussion of the structural aspects of the present invention is followed by a discussion of corresponding operational aspects. Unless otherwise indicated, like parts and processes are referred to with like reference numerals.

Structural Aspects of the Present Invention

Referring now to FIG. 1, depicted therein is a block diagram of a network data processing system. Within the network data processing system shown in FIG. 1, commonly used network addresses (e.g., IP addresses used by two or more enterprises to address network resources, etc.) may be used to address network resources managed by a common management system. Accordingly, network data processing system 100 includes a management system 102, routers 104 and 112 having respective network interface ports 106, 114, and 122 private networks 108, 116, and 120 and users within respective user communities 110, 118, and 124. The arrangement of structures and parties within system 100 will be immediately understood by those skilled in the art. It should be understood that system 100 includes structures which incorporate Internet Protocol (IP) based technologies which will be readily understood by those skilled in the art.

Management system 102 includes a typical arrangement of computing and network resources such as processors, peripherals, and data storage systems which, according to the present invention, will allow private networks which utilize common IP addresses to be addressed and serviced appropriately. Routers 104 and 112 are typical network routers similar or like those manufactured by CISCO CORPORATION (e.g., the CISCO 7000 IP Router). In accordance with the present invention, a router like routers 104 and 112 will be configured to process and route packet data that include commonly used IP addresses. Private networks 108, 116, and 120 are typical network data processing systems and environments which may be operated by an enterprise and which include a collection of one or more processors, peripherals, data storage systems, etc. The users within user communities 110, 118, and 124 are outfitted with data processing terminals (e.g., terminals, personal computing systems, etc.) in typical fashion.

The interconnections and couplings of the structures within system 100 will be readily understood by those skilled in the art. For example, routers 104 and 112 may be coupled to management system 102 via IP links.

In system 100, private network 108 and private network 116, for example, possess network address blocks that have been independently set to include an address value such as 10.100.100.10. For purposes of discussion and illustration, however, only one IP address is mentioned below. Despite the fact that private network 108 and private network 116 are addressed and/or allow addressing with the same (i.e., common) IP address, management system 102 is now able to process packet data appropriately for each private network that it serves. Accordingly, if a user from user community 110 intends to transmit a packet containing the IP address "10.100.100.10" (e.g., a packet corresponding to an electronic mail item) to another user in that community, that packet will be appropriately processed by management system 102 and delivered to the recipient user in user community 110. Such functionality will be achieved regardless of whether a user in user community 118 transmits a packet containing the IP address 10.100.100.10.

Accordingly, the present invention now allows a management company (e.g., a service provider) who operates and maintains management system 102 and the resources thereof to service many private networks for customers who may, by happenstance, posses and utilize common network or IP addresses. As such, a management company need not have to create individual resource farms to service multiple customers. Instead, a management company can now use and share computing and network resources to service one or more customers thereby creating economies of scale and the like.

It should be understood that management system 102 is configured to act as a service provider's network or collection of network resources that are maintained and operated to service user communities associated with private networks such as private networks 108 and 116. Private networks 108 and 116 may be thought of as networks which are either located within a particular enterprise or which are "facilities managed" by the entity that operates and maintains management system 102. Of course, any other placement or arrangement that may be implemented as a private network may be incorporated into the present invention. The present invention now allows two or more networks that utilize a common or duplicated network address to have network management options which have heretofore not been realized.

It also should be noted that although system 100 is shown to include only one management system, two routers, and three private networks, the present invention is not so limited. To the contrary, the present invention will support any number of management systems, routers, and private networks that are interconnected to service corresponding private computing environments.

And, it should also be noted that while the present invention will support commonly used address such as those used by private networks 108 and 116, the present invention also will support network addresses which may be otherwise considered as unique addresses (i.e., until the same are selected by another enterprise to be managed and/or serviced by management system 102) such as those addresses which are used within private network 120. For purposes of brevity, however, private network 120 and any addressing that normally transpires therein will not be further addressed below.

Figure 2:
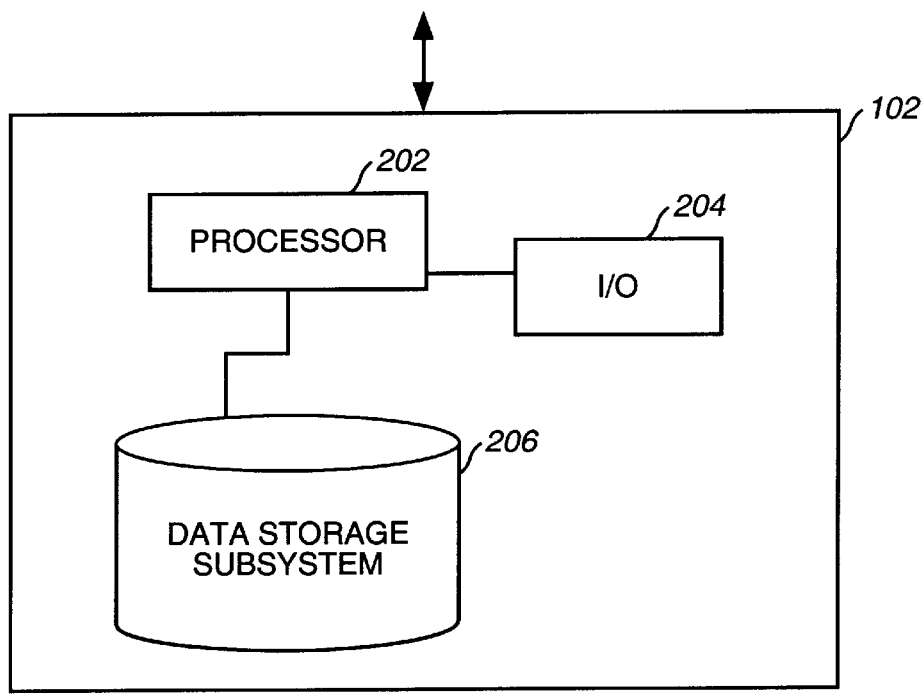
FIG. 2 is a block diagram of the management system illustrated in FIG. 1.

Referring now to FIG. 2, depicted there is a block diagram of management system 102 as originally illustrated in FIG. 1. Management system 102 includes one or more processors 202, a network I/O unit 204, and a data storage subsystem 206 which are coupled together in typical fashion. A suitable computing and network system that may be incorporated into system 100 (FIG. 1) is a SUN SPARC 1000 data processing system which is manufactured and marketed by SUN MICRO SYSTEMS, INC. or a system of similar or like functionality.

Data in the form of TCP/IP or IP packets are sent to and from management system 102 via routers 104 and 112 in conventional ways. Such packet data is communicated through network I/O unit (ports) 204 and processed by processor 202 in conjunction with data stored and to be stored in and retrieved from data storage subsystem 206. A discussion of the types and nature of the data stored and retrieved in data storage subsystem 206 is found below in regard to FIGS. 9A and 9B. The operation of management system 102 is described in detail below with regard to FIGS. 4–8.

Figure 3:
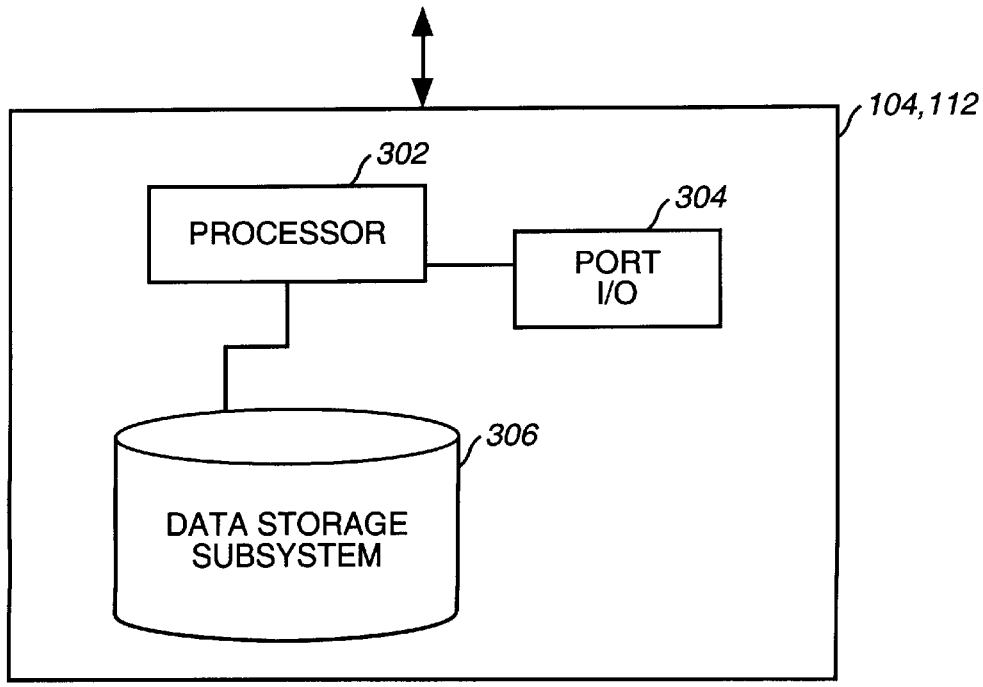
FIG. 3 is a block diagram of a network router like the routers illustrated in FIG. 1.

Referring to FIG. 3, depicted therein is a block diagram of a network router similar or like routers 104 and 112 as originally illustrated in FIG. 1. Routers 104 and 112 each include a processor 302, a port I/O interface unit 304 which allows packet and data I/O on one or more interface ports (e.g., ports 196, 114, and 122 as shown in FIG. 1), and a data storage subsystem 306 which may be used to temporarily store addressing data used by routers 104 and 112 to route packet data to and from management system 102. A suitable router system that may be implemented for routers 104 and 112 in system 100 (FIG. 1) is the CISCO 7000 router (mentioned above).

Data in the form of TCP/IP or IP packets are sent to and from (and communicated through) routers 104 and 112 to private networks 108, 116, and 120 and management system 102, respectively. The flow of packet data through routers 104 and 112 will be immediately understood by those skilled in the art. Exemplary operations of management system 102, routers 104 and 112 are described in detail below with regard to FIGS. 4–8.

Operational Aspects of the Present Invention

The structures depicted in FIGS. 1–3 are configured to operate together to route and process network packets and data contained therein in a network data processing environment where private networks (and enterprises) have adopted and are using a common network address such as a common or duplicated IP address. The requisite and salient operations to bring about such functionality are illustrated in FIGS. 4–8. More particularly, the operations depicted in FIGS. 4–8 are, in many respects, intended to be carried out via execution of appropriate computer software. Such computer software and, in particular, the programming constructs necessary to bring about such operations and results will be readily apparent to those skilled in the art after reviewing and understanding the operations illustrated in FIGS. 4–8.

Figure 4:
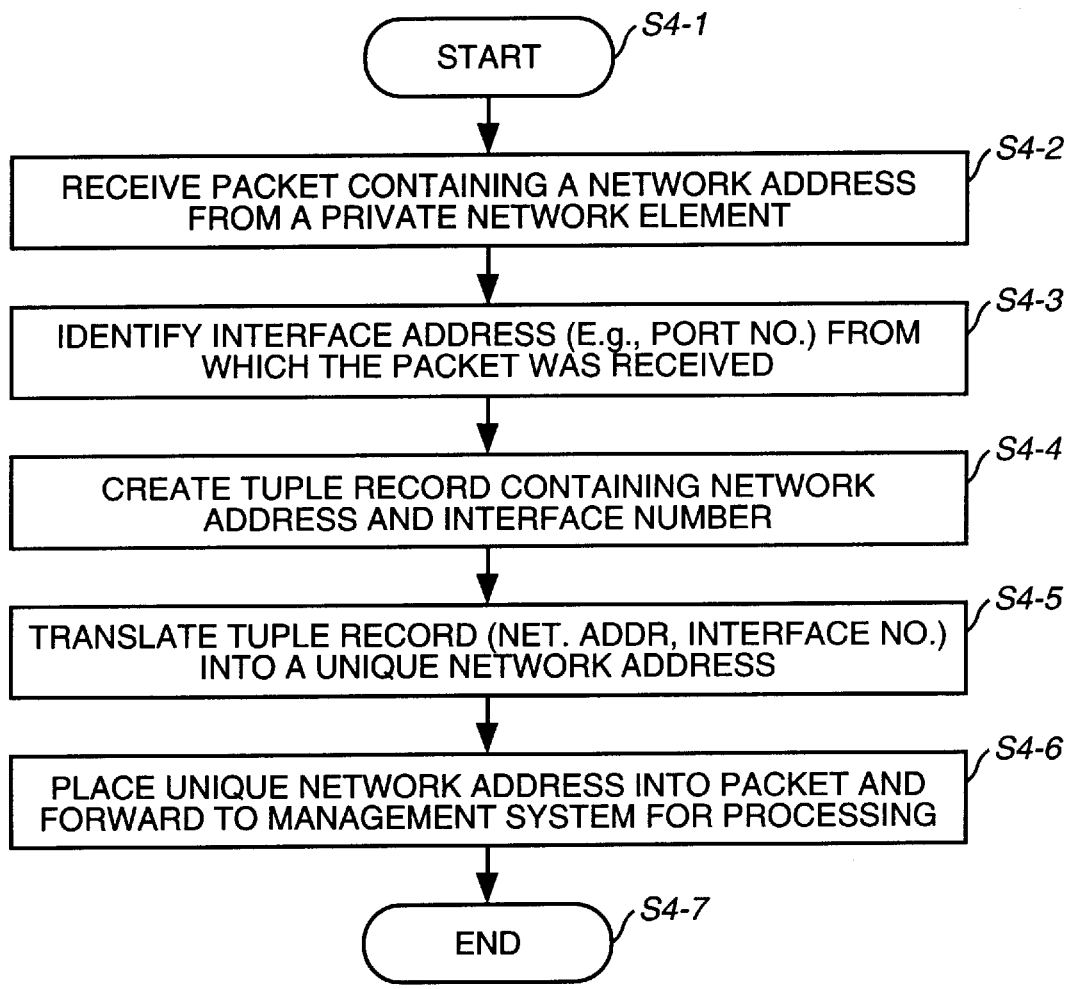
FIG. 4 is a flow chart that illustrates the operations carried out by a router in receiving packet data from a private network element according to a preferred embodiment of the present invention.

Referring now to FIG. 4, depicted therein is a flow chart that illustrates the operations carried out by a router (e.g., routers 104 and 112) in receiving packet data from a private network element according to a preferred embodiment of the present invention. For example, such packet data may include an electronic mail item from one user in a private network's user community to another user.

Processing starts as Step S4-1 and immediately proceeds to Step S4-2. At Step S4-2, router 104 or router 112 will receive an IP packet containing a network address (e.g., 10.100.100.10) from a private network element (e.g., a mail server computer system, etc.).

Next, at Step S4-3, router 104 or router 112 will identify the port interface address or identifier (e.g., a physical or logical port number, etc.) from which the aforementioned IP packet was received. Thereafter, at Step S4-4, systems within a router will create a addressing tuple (an ordered set of data of fixed size) containing a mapping pair including the network address and the interface address. Such a record will be stored in a data storage subsystem (e.g., a memory unit, etc.) of either router 104, or router 112.

Next, at Step S4-5, the aforementioned address pair ("network address, interface address") will be translated or mapped into a unique network address. The mapped unique network address may take any form such a string of digits which may or may not look like a typical 32-bit IP address. For example, the mapped unique network address may look like "UA1938476" in the case of a non-IP formatted address or "999.34.12.127" in the case of a IP-look-alike address). Alternatively, the mapped unique network address may be formed by concatenating the network address (e.g., a commonly used network address) with a physical interface port number to produce a router-port unique network address. The exact nature and make-up of the mapped unique address which is formatted for a router may depend on the address alteration abilities of the particular router that is chosen and the particular design requirements that are established in the particular system that incorporates the present invention's addressing schemes. In any case, if a particular network protocol is reliant on IP formatted packets, the mapped unique address will likely have to be formatted as an IP address regardless, however, of the value of such an IP-look-alike address (e.g., a mapped unique address that is selected from an otherwise public use range, etc.).

The unique network address stored within the router will be supplied to the router from management system 102 which is charged with the responsibility of establishing and creating unique network addresses and provisioning the same to router storage facilities for appropriate mapping and network routing processes. The establishment of unique addresses is discussed below in regard to the flow chart illustrated in FIG. 8.

In any case, at Step S4-6, the mapped unique network address is placed into the packet header and forwarded or routed to management system 102 for appropriate receipt and processing. It should be understood that there is no alteration of the data contained in a network packet (also referred to as the "payload" of the network packet). The present invention and the operations just described merely adjust network packet headers by substituting network addresses.

Processing ends at Step S4-7.

Figure 5:
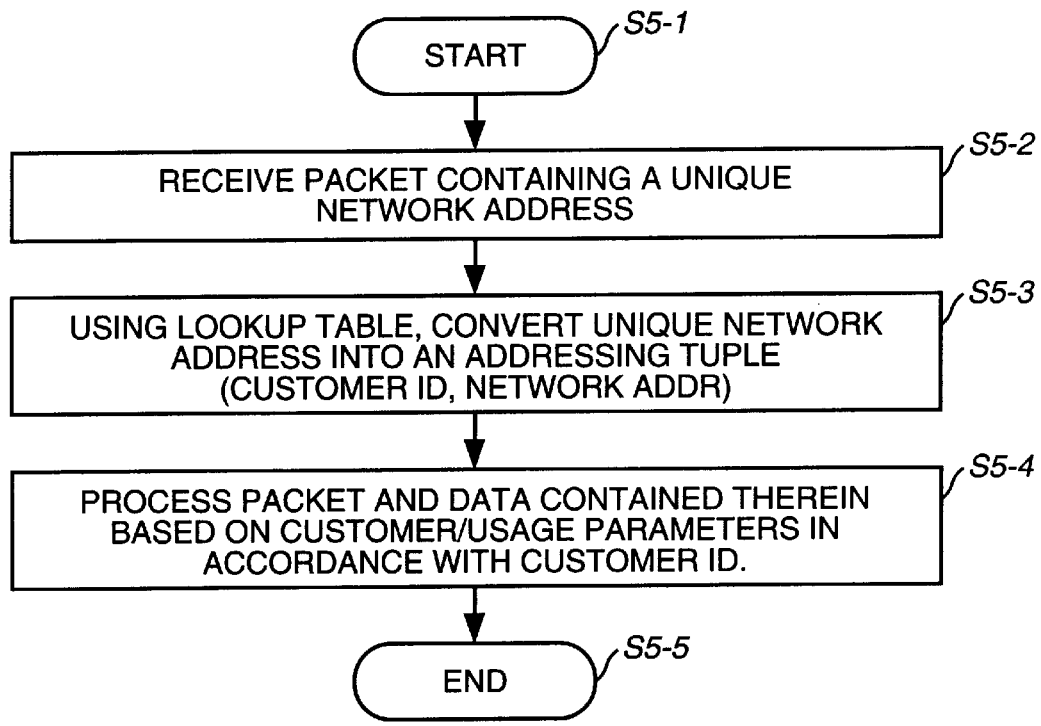
FIG. 5 is a flow chart that illustrates the operations carried out by a management system in receiving packet data from a router according to a preferred embodiment of the present invention.

Referring now to FIG. 5, depicted therein is a flow chart that illustrates the operations carried out by a management system (e.g., management system 102) in receiving packet data from a router according to a preferred embodiment of the present invention.

Processing starts at Step S5-1 and immediately proceeds to Step S5-2. At Step S5-2, management system 102 will receive a packet from a router (as indicated in the flow chart of FIG. 4). The received packet will contain a unique network address as described above.

Next, at Step S5-3, management system 102 will convert the unique network address into an addressing tuple ("customer/usage identifier, network address"). Such a conversion will involve a database query or lookup operation relative to an appropriate table having at least two fields corresponding to the network address as formatted for a router system and the customer/usage identifier, respectively. The customer/usage identifier will identify the private network that is to be serviced and, possibly, the nature and type of computing operation to be carried out on behalf of a particular network customer, etc. The creation and maintenance of a lookup table to achieve such functionality will be readily apparent to those skilled in the art.

Next, at Step S5-4, management system 102 will process the packet and data contained therein in accordance with customer parameters corresponding to the customer/usage identifier that also corresponds to the network address. For example, if the data contained in the packet represents an electronic mail item to be distributed among users within a particular user community, management system 102 will process accordingly.

Processing ends at Step S5-5.

Figure 6:
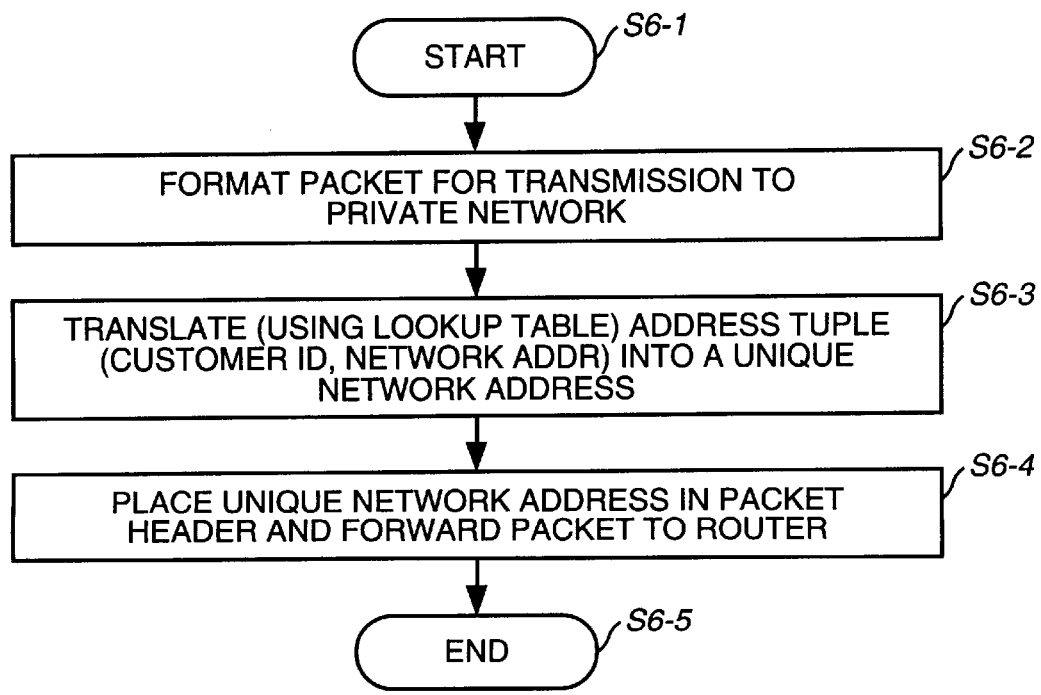
FIG. 6 is a flow chart that illustrates the operations carried out by a management system in sending packet data to a router for further forwarding according to a preferred embodiment of the present invention.

Referring now to FIG. 6, depicted therein is a flow chart that illustrates the operations carried out by a management system (e.g., management system) in sending packet data to a router for further forwarding according to a preferred embodiment of the present invention.

Processing starts at Step S6-1 and immediately proceeds to Step S6-2. At Step S6-2, management system 102 formats packet and data for submission to a private network (e.g., private network 108).

Next, at Step S6-3, management system 102 will translate (using a lookup table) an address tuple as described above (i.e., "customer/usage identifier, network address) into a unique network address.

Thereafter, at Step S6-4, management system 102 will place the unique network address into the packet and forward the same to a router for further routing and forwarding to a particular private network and, ultimately, to a user thereof.

Processing ends at Step S6-5.

Figure 7:
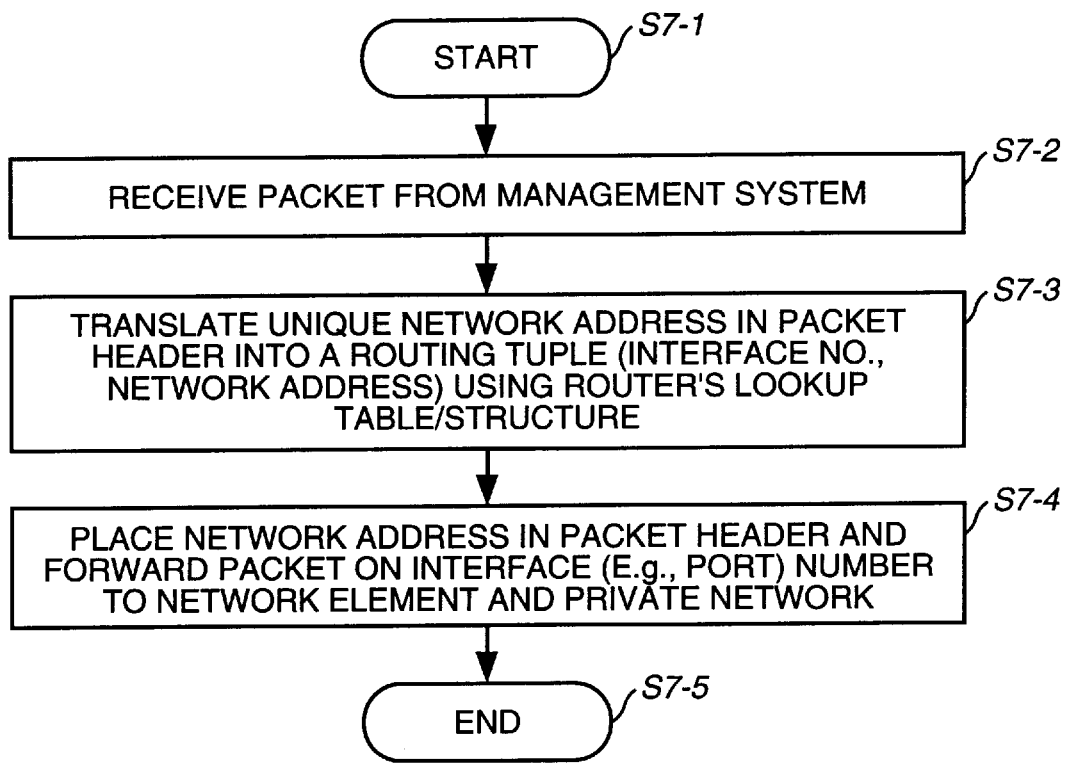
FIG. 7 is a flow chart that illustrates the operations carried out by a router in sending packet data to a private network element according to a preferred embodiment of the present invention.

Referring now to FIG. 7, depicted therein is a flow chart that illustrates the operations carried out by a router in sending packet data to a private network element according to a preferred embodiment of the present invention.

Processing starts at Step S7-1 and immediately proceeds to Step S7-2. At Step S7-2, a router (e.g., router 104) will receive a packet from management system 102 as described above in regard to FIG. 6.

Next, at Step S7-3, the processor in the router will translate the unique network address in the packet header into a routing tuple record including an interface number (e.g., port number, etc.) and a network address (e.g., a commonly used network address). Such a translation can be accomplished using some form of lookup structure that may be stored in a memory device, etc.

Thereafter, at Step S7-4, the processor in the router will place the network address in the packet header and forward the same via the port having the aforementioned interface number to the network element within the appropriate private network.

Processing ends at Step S7-5.

Figure 8:
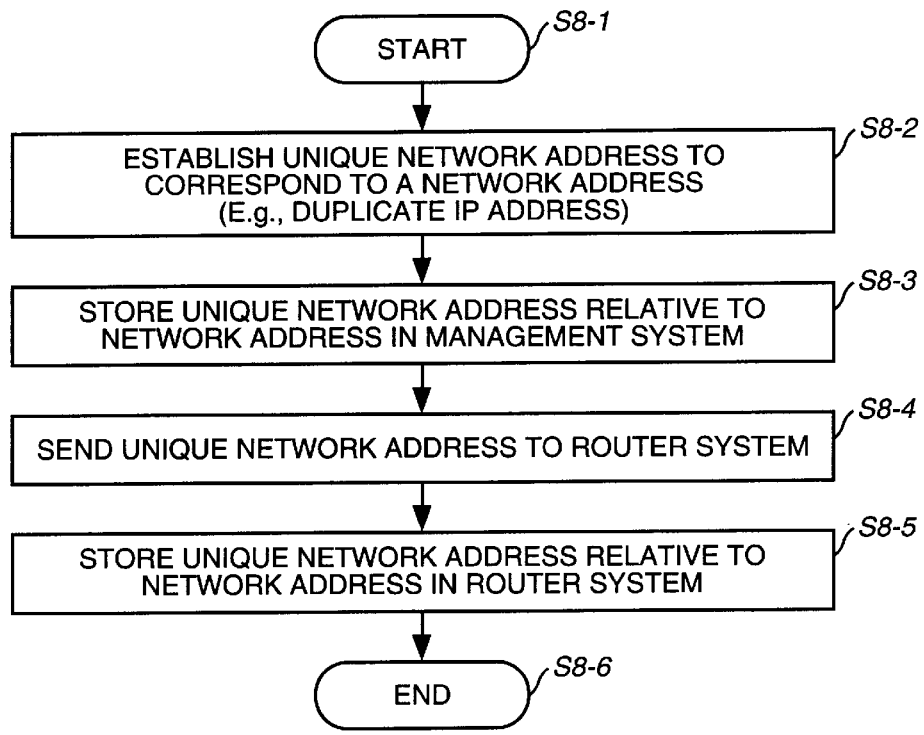
FIG. 8 is a flow chart that illustrates the operations carried out by a management system in establishing a network address relationship according to a preferred embodiment of the present invention.

Referring now to FIG. 8, depicted therein a flow chart that illustrates the operations carried out by management system 102 in establishing a network address relationship according to a preferred embodiment of the present invention. Such a network address relationship will allow private networks sharing a "common" or duplicated network address to be managed by a common management system without requiring such a management system to deploy separate sets of resources. In other words, the establishment of unique addresses within the present invention will allow a management system to efficiently and cost effectively share resources to service several private networks and customers. For example, management system 102 could operate and maintain a mail server system which will properly route electronic mail items (and network packets corresponding to such electronic mail items) to user populations that internally address network resources with a common or duplicated network (e.g., IP) address.

Processing starts at Step S8-1 and immediately proceeds to Step S8-2. At Step S8-2, management system 102 will establish a unique network address to correspond to a network address which appears to be a common or duplicated address (e.g., a new customer identifies a network address that is used internally and which is already known to management system 102 to be an address corresponding to another customer). The commonly used address may be in the form of a commonly used IP address.

The establishment of a unique network address and the nature of the unique network address may vary depending of particular design parameters. Preferably, however, a unique network address is established and assigned to correspond to a particular (e.g., a duplicated or commonly used network address) network address by selecting the same from a pool of known unique network addresses. Selecting such an address can be as simple as taking a next-assignable address from an address pool, incrementing an address counter, etc. Such techniques for assigning network addresses will be readily understood by those skilled in the art. The nature and format of the assigned unique network address may be that of an IP address or of any other address format that is chosen to suit particular design requirements and network protocols. In fact, the present invention will even allow the assignment of what would otherwise appear to be publicly assignable IP addresses; this is the case because the unique network address that is assigned is never manifested outside of a management system or routers that are coupled thereto. This fact is especially important in the operation of network computing environments where gateway systems are implemented to route network traffic.

In any case, the unique network addresses which are internal to and which are established and provisioned by management system 102 can be of any value such as values outside of the range stipulated by IETF standard RFC 1918 (see above).

Next, at Step S8-3, management system 102 will store the unique address relative to a network address (e.g., the otherwise commonly used network address) in a data storage system. For example, management system 102 may store the aforementioned addressing data in a lookup table as described above.

Next, at Step S8-4, management system 102 will send the unique address to one or more router systems. And, at Step S8-5, such router system(s) will store the unique network address relative to the network address in a data storage system (e.g., on a disk drive, in a memory unit, etc.). Accordingly, Steps S8-4 and S8-5 illustrate the provisioning of management information base (MIB) data maintained by management system 102 to router(s) which are coupled to a particular customer network.

Processing ends at Step S8-6

The flow charts in FIGS. 4–8 illustrate the salient steps that are carried out to route packets among private networks that have adopted and are using network addresses (e.g., commonly used, private IP addresses). Those steps are able to achieve proper routing through use of paired data objects which allow address mappings to occur. Such paired data objects may be stored in a variety of memory and data storage systems found within management system 102 and routers 104 and 112. More particularly, such paired data objects may be maintained by database management systems and/or by system routines that manage volatile data objects within random access memories. In any case, the structure of such paired data objects that will allow the above-described steps to be carried out to enable two or more private networks to possess and used common, private IP addresses and to be serviced by a common management system 102, are illustrated in FIGS. 9A and 9B.

Figure 9A:
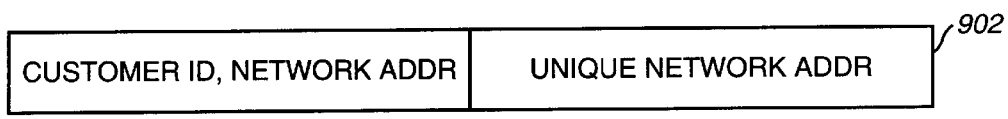
FIG. 9A is a table diagram of a lookup table used by a management system according to preferred embodiment of the present invention.

Referring now to FIG. 9A, depicted therein is a table diagram of a lookup table used by management system 102 according to preferred embodiment of the present invention. In particular, table diagram 902 includes storage capacity to retrievably store at least two data values. Such data values relate to a tuple containing "customer/usage identifier, network address" and to a unique network address. Data stored in a table corresponding to table diagram 902 will allow management system 102 (as noted above) to map a unique network address (e.g., a private IP address that has been concatenated to a physical port number of a particular router, etc.) to a customer/usage identifier. Once mapped, a customer/usage identifier will allow management system 102 to process a packet containing the same based on parameters established for the particular customer or intended use of management system 102. The actual data structures used to retrievably store the aforementioned data values may vary depending on the implementation details of a particular management system. For example, the data structures used to retrievably store the aforementioned data values may include lookup tables stored in memory, on disk, etc., and may be managed by appropriate system routines and functions (e.g., database management routines, etc.) which will be immediately apparent to those skilled in the art. Preferably, the data structures that are chosen to retrievably store the data values shown in table diagram 902 will allow for fast querying, mapping, and the like.

Figure 9B:
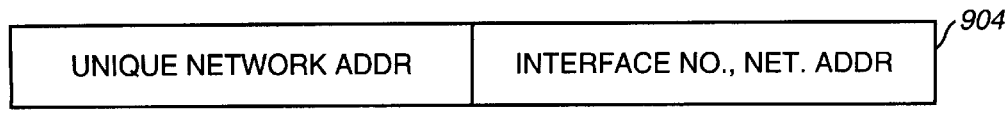
FIG. 9B is a table diagram of a lookup table used by a router according to a preferred embodiment of the present invention.

Referring now to FIG. 9B, depicted therein is a table diagram of a lookup table used by a router according to a preferred embodiment of the present invention. In particular, table diagram 904 includes storage capacity to retrievably store at least two data values. Such data values relate to a unique network address as described above, and to a tuple containing "interface number, network address." The data shown in table diagram 804 will allow a router such as routers 104 and 112 (as described above) to map or translate an address pair ("interface address, network address") into a unique network address that, ultimately, may be used within management system 102 to process packets and data contained therein for a particular customer. The actual data structures used to retrievably store the aforementioned data values may vary depending on the implementation details of a particular router system. For example, the data structures used to retrievably store the aforementioned data values may include lookup tables stored in a memory unit of a router and may be managed by appropriate system routines and functions which will be immediately apparent to those skilled in the art. Preferably, the data structures that are chosen to retrievably store the data values shown in table diagram 902 will allow for fast querying, mapping, and the like.

Thus, having fully described the present invention by way of example with reference to the attached drawing figures, it will be readily appreciated that many changes and modifications may be made to the invention and to any of the exemplary embodiments shown and/or described herein without departing from the spirit or scope of the invention which is defined in the appended claims.

What is claimed is:

1. A system for monitoring and controlling at least one network among a plurality of networks within a network data processing environment, comprising:

a router having an interface for communicating a network packet, said network packet including a network address, said interface having a unique interface identifier relative to said router, said router being configured to map said network address and said unique interface identifier to a unique network address and to replace said network address in said network packet with said unique network address; and a management system coupled to said router and configured to receive said network packet from said router, to map said unique network address in said network packet to a usage identifier, and to process said network packet and data contained therein based on said usage identifier, wherein said usage identifier identifies a private network to be managed by said management system and said unique address is internal to said management system.

2. The system according to claim 1, wherein said router includes a data storage system and processor coupled to said data storage system, said processor configured to map said network address and said unique interface identifier to a unique network address and to replace said network address in said network packet with said unique network address.

3. The system according to claim 1, wherein said management system includes a data storage system and a processor coupled to said data storage system, said processor configured to map said unique network address in said network packet to a customer identifier and to process said network packet based on said customer identifier.

4. The system according to claim 1, wherein said network packet is formatted as an IP packet.

5. The system according to claim 1, wherein said network address is an IP address.

6. The system according to claim 1, wherein said interface identifier is a port number corresponding to a port serviced by said router.

7. The system according to claim 1, wherein said unique network address is formatted as an IP address that is meaningful within said management system.

8. The system according to claim 1, wherein said usage identifier corresponds to an entity serviced by said management system.

9. The system according to claim 1, wherein said router maps said network address and said unique interface identifier to said unique network address based on corresponding entries in a router map table managed by said router.

10. The system according to claim 1, wherein said management system maps said unique network address in said network packet to said usage identifier based on corresponding entries in an address map table managed by said management system.

11. A method for managing a plurality of networks, comprising the steps of:
receiving a network packet containing a unique network address from a network data processing environment, said unique network address based on a network address corresponding to a network element within said network data processing environment;
mapping said unique network address into a usage identifier by means of a management system, said usage identifier corresponding to a network resource addressable within said network data processing environment, wherein said unique network address is internal to said management system; and
processing said network packet based on usage parameters corresponding to said usage identifier.

12. The method according to claim 11, wherein said network packet is formatted as an IP packet.

13. The method according to claim 11, wherein said network address is an IP address.

14. The method according to claim 11, wherein said processing step further includes a step of performing a particular data processing activity based on data contained within said network packet.

15. The method according to claim 11, wherein said mapping step further includes a step of performing a lookup function based on said unique network address to determine said usage identifier.

16. A method for managing a plurality of networks within a network data processing environment, comprising the steps of:
formatting a network packet for transmission to a network element, said network packet including a usage identifier and a network address corresponding to said usage identifier;
mapping said said network address into a unique network address;
mapping said unique network address to a usage identifier by means of a management system, said unique network address being internal to said management system;
inserting said unique network address into said network packet; and
routing said network packet to said network element based on said unique network address via said network data processing environment.

17. The method according to claim 16, wherein said network address is formatted as an IP address.

18. The method according to claim 16, wherein said network packet is formatted as an IP packet.

19. The method according to claim 16, wherein said mapping step further includes a step of performing a lookup function based on said usage identifier and said network address to determine said unique network address.

20. The method according to claim 16, wherein said unique network address is formatted as an IP address.

21. A system for managing a plurality of private networks, comprising:
a plurality of routers, each of said plurality of routers communicating with a private network;
each of said plurality of routers having an interface with a unique interface identifier for communicating a network packet having a network address, each of said routers further including means to translate said network address to a unique network address;
a management system communicating with each of said plurality of routers and configured to receive network packets from each of said plurality of routers, to map said unique network address in said network packet to a usage identifier, and to process said network packet and data contained therein based on said usage identifier, wherein said usage identifier identifies a private network, among said plurality of private networks, to be managed by said management system, and wherein said unique network is internal to said management system.

22. The system of claim 21, wherein each of said plurality of routers includes a data storage system and processor coupled to said data storage system, said processor configured to map said network address and said unique interface identifier to a unique network address and to replace said network address in said network packet with said network address.

23. The system of claim 21, wherein said management system includes a data storage system and a processor coupled to said data storage system, said processor configured to map said unique network address in said network packet to a customer identifier and to process said network packet based on said customer identifier.

24. The system of claim 21, wherein said network packet is formatted as an IP packet.

25. The system of claim 21, wherein said network address is an IP address.

26. The system of claim 21, wherein said interface identifier is a port number corresponding to a port serviced by each of said routers.

27. The system of claim 21, wherein said unique network address is formatted as an IP address that is meaningful within said management system.

28. The system of claim 21, wherein said usage identifier corresponds to an entity serviced by said management system.

29. The system of claim 21, wherein each of said routers map said network address and said unique interface identifier to said unique network address based on corresponding entries in a router map table managed by said router.

30. The system of claim 21, wherein said management system maps said unique network address in said network packet to said usage identifier based on corresponding entries in an address map table managed by said management system.

31. A system for managing a plurality of private networks, comprising:

at least one router in communication with each of said private networks, said router having an interface with a unique interface identifier for communicating a network packet having a network address, and said router including an address translation means for translating a network address into a unique internal network address;

a management system communicating with said router includes means to map said unique internal network address to a usage identifier, and to process said network packet and data contained therein based on said usage identifier, wherein said usage identifier identifies a private network among said plurality of private network.

32. The method according to claim 19, wherein said network address is formatted as an IP address.

33. A method for managing a plurality of networks within a network data processing environment, comprising the steps of:

(a) routing information from each of said plurality of private networks to management system by means of each of a plurality of routers, each of said plurality of routers further comprising
  (I) an interface with a unique interface identifier for communicating a network packet having a network address; and
  (ii) a means to translate said network address to a unique internal address;
(b) mapping said unique internal network address in said network packet, by said management system to a usage identifier to process said network packet and data contained therein based on said usage identifier, said usage identifier identifying a private network among said plurality of private networks being managed by said management system.

34. The method according to claim 33, wherein said network address is formatted as an IP address.

35. The method according to claim 33, wherein said unique network address is formatted as an IP address.

36. The method according to claim 33, wherein said storing steps respectively store said unique network address relative to said network address in respective lookup tables within said management system and said router.

37. The method according to claim 33, wherein said establishing step further comprises a step of selecting said unique network address from a pool of unique network addresses.

* * * * *